United States Patent
Bellows et al.

(10) Patent No.: US 8,884,744 B2
(45) Date of Patent: Nov. 11, 2014

(54) PORTABLE DATA TAG READER DEVICE, SYSTEM AND METHOD FOR IDENTIFYING A LOCATION OF A DATA TAG USING A READ ZONE AND LOCATION OF THE READER

(75) Inventors: David E. Bellows, Wantagh, NY (US); Thomas E. Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 291 days.

(21) Appl. No.: 13/339,467

(22) Filed: Dec. 29, 2011

(65) Prior Publication Data

US 2013/0169415 A1 Jul. 4, 2013

(51) Int. Cl.
*G08B 21/00* (2006.01)

(52) U.S. Cl.
USPC ............ 340/10.1; 340/572.1; 340/572.4; 340/10.3; 340/10.4; 367/99; 235/385

(58) Field of Classification Search
CPC .................... G01S 5/0284; G06K 7/0008
USPC ........................... 367/99; 235/385
See application file for complete search history.

(56) References Cited

U.S. PATENT DOCUMENTS

| | | | |
|---|---|---|---|
| 6,141,293 A | 10/2000 | Amorai-Moriya et al. | |
| 7,295,114 B1 | 11/2007 | Drzaic et al. | |
| 7,527,198 B2 * | 5/2009 | Salim et al. | 235/385 |
| 7,616,113 B2 | 11/2009 | Ayachitula et al. | |
| 8,604,909 B1 | 12/2013 | Amir et al. | |

(Continued)

FOREIGN PATENT DOCUMENTS

EP 2355368 A1 8/2011

OTHER PUBLICATIONS

International Search Report and Written Opinion mailed Apr. 29, 2013 in counterpart application PCT/US2012/067981.

(Continued)

*Primary Examiner* — Mohammad Ghayour
*Assistant Examiner* — Mark Rushing

(57) ABSTRACT

A portable data tag method, device and system for identifying a location of a data tag. The method comprises reading the data tag by a portable data tag reader device; determining, by a processor in operative communication with the reader device, a location of the portable data tag reader device; determining, by the processor, a read zone of the portable data tag reader device, relative to the location of the portable data tag reader device; and determining, by the processor, the location of the data tag using the location of the portable data tag reader device and the read zone of the portable data tag reader device.

20 Claims, 5 Drawing Sheets

(56) References Cited

U.S. PATENT DOCUMENTS

| | | |
|---|---|---|
| 2004/0150520 A1 | 8/2004 | Barrie |
| 2005/0212676 A1* | 9/2005 | Steinberg .................... 340/572.8 |
| 2006/0022038 A1 | 2/2006 | Hewlin et al. |
| 2006/0022800 A1* | 2/2006 | Krishna et al. ................ 340/10.2 |
| 2006/0176152 A1 | 8/2006 | Wagner et al. |
| 2007/0040687 A1 | 2/2007 | Reynolds |
| 2007/0268133 A1* | 11/2007 | Sanchez et al. ............. 340/568.1 |
| 2008/0238621 A1 | 10/2008 | Rofougaran et al. |
| 2009/0016165 A1 | 1/2009 | Lee |
| 2009/0216446 A1 | 8/2009 | Ma et al. |
| 2010/0007496 A1 | 1/2010 | Orlassino |
| 2012/0127976 A1 | 5/2012 | Lin et al. |
| 2013/0154802 A1 | 6/2013 | O'Haire et al. |
| 2013/0169414 A1 | 7/2013 | Bellows et al. |
| 2013/0181869 A1 | 7/2013 | Chawla et al. |
| 2013/0249736 A1 | 9/2013 | Nikitin et al. |

OTHER PUBLICATIONS

International Search Report and Written Opinion for International Patent Application No. PCT/US2012/067972 mailed Apr. 5, 2013.

Non-Final Office Action mailed Mar. 27, 2014, in U.S. Appl. No. 13/339,442, David E. Bellows et al, filed Dec. 29, 2011.

Final Office Action mailed Jun. 9, 2014, in U.S. Appl. No. 13/339,442, David E. Bellows et al., filed Dec. 29, 2011.

* cited by examiner

PORTABLE DATA TAG READER DEVICE, SYSTEM AND METHOD FOR IDENTIFYING A LOCATION OF A DATA TAG USING A READ ZONE AND LOCATION OF THE READER

RELATED APPLICATIONS

The present application is related to the following United States Patent Application commonly owned with this application by Motorola Solutions, Inc.: application Ser. No. 13/339,442, filed Dec. 29, 2011, titled "METHOD AND APPARATUS FOR RADIO FREQUENCY IDENTIFICATION (RFID) DATA TRANSMISSION", the entire contents of which being incorporated herein by reference.

FIELD OF THE DISCLOSURE

The present disclosure relates generally to data tags, and more particularly to identifying a location of a data tag.

BACKGROUND

Barcodes and radio frequency identification (RFID) tags are examples of data tags that are widely used to mark, inventory and track various products.

Barcodes are optical, machine readable representations of data. Barcodes may be linear or two-dimensional, and can be used to store any type of data. Barcodes are commonly used to store a product identifier, but modern barcodes may include reference to a Uniform Resource Locator (URL) or other data.

RFID tags generally transmit to a reader device a radio frequency (RF) signal that includes product information. RFID tags generally include an integrated circuit for storing and processing information, a transceiver for transmitting and receiving RF signals, and an antenna. Some RFID tags are active RFID tags and include their own battery power source. Passive RFID tags do not have their own power source and require receiving a power signal from the reader device to operate. To interrogate a passive RFID tag, a reader generally transmits a continuous wave (CW) or modulated RF signal to the tag. The tag receives the signal and responds by modulating the signal and then "backscattering" an information response signal to the reader device. The reader device receives the response signal from the tag, and the response signal is demodulated, decoded and further processed.

Handheld data tag reader devices are now commonly used for identifying, cataloging, and locating various types of objects that are tagged with data tags. Such objects include relatively large products such as pallets, boxes, containers and big parts or components; and relatively small products such as fasteners, electronic components, and small parts that are stored in bins with large numbers of similar parts.

However, it is difficult to identify a location of a data tag relative to a known point when the reader device does not have a fixed position.

Accordingly, there is a need for an improved method and apparatus for identifying a location of a data tag.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
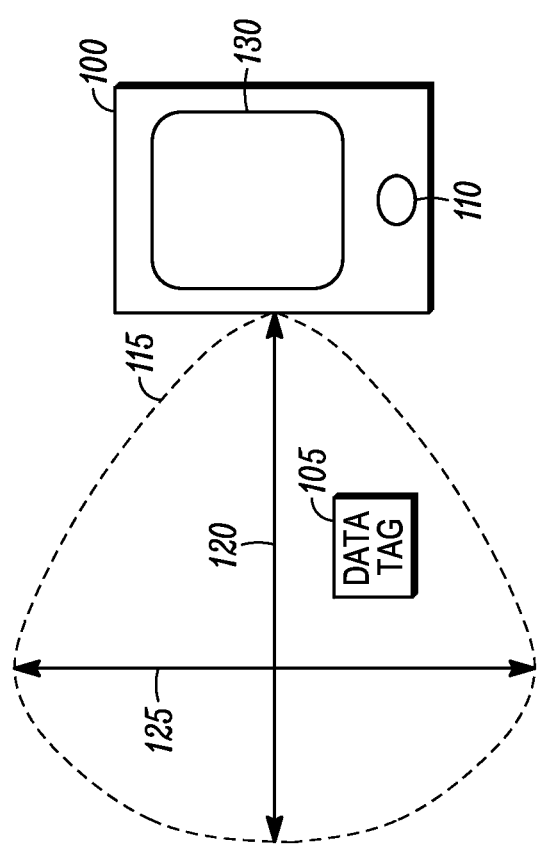
FIG. 1 is a block diagram of a data tag reader device for identifying a location of a data tag, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method is provided for identifying a location of a data tag. The method comprises reading the data tag by a portable data tag reader device; determining by a processor in operative communication with the reader device, a location of the portable data tag reader device; determining, by the processor, a read zone of the portable data tag reader device, relative to the location of the portable data tag reader device; and identifying, by the processor, the location of the data tag using the location of the portable data tag reader device and the read zone of the portable data tag reader device.

Advantages of certain embodiments include an ability to determine a location of a data tag relative to a predetermined point, or the relative locations of a plurality of data tags when read from different positions.

FIG. 1 is a block diagram of a data tag reader device 100 for identifying a location of a data tag 105, according to one embodiment.

The data tag reader device 100 includes an activation button 110. The activation button 110 is used to activate reading of the data tag 105. The activation button 110 can be a physical button, or a virtual button, a finger-trigger mechanism, a keyboard, a graphical user interface (GUI), and/or a voice activated mechanism.

The location and orientation of the data tag reader device 100 is then determined. The location of the data tag reader device 100 can be determined, for example, using a Global Positioning System (GPS) module (not shown) built into the data tag reader device 100. The orientation of the data tag reader device 100 can be determined, for example, using a gyroscope, an accelerometer and/or a compass built into the data tag reader device 100.

The location and orientation of the data tag reader device 100 is determined independently of activation of the data tag reader device 100. According to one embodiment, the location and orientation of the data tag reader device 100 is determined upon activation of the data tag reader device 100.

According to one embodiment, the data tag reader device 100 includes a camera (not shown). The location and/or orientation of the data tag reader device 100 then can be determined using the camera and comparisons with, for example, pre-determined images. This is particularly suited for when the environment in which the data tag reader device 100 operates is well known.

The data tag reader device 100 has a read zone 115. The read zone 115 corresponds to a zone in which the data tag reader device 100 can read the data tag 105, and is relative to the location and in some embodiments the orientation of the data tag reader device 100. The read zone 115 can be directional, as illustrated in FIG. 1, or alternatively, omni-directional (not shown). When multiple antennas or sensors are used, the read zone can be determined by the pattern of the antennas or sensors. Additionally, the read zone 115 can be fixed or variable. For example, the data tag reader device 100 can include strength or focus settings that modify the read zone 115.

When the data tag reader device 100 comprises an RFID reader device, power output settings of the RFID reader device can be used to vary the read zone 115. When the data tag reader device 100 comprises a barcode or image reader device, settings of an optical sensor can be used to vary the read zone 115.

Characteristics of the read zone 115 may be known by the data tag reader device 100, or alternatively determined in real time by the data tag reader device 100.

An example of characteristics of the read zone 115 that may be known or determined by the data tag reader device 100 include a maximum distance 120 from the data tag reader device 100 that the read zone 115 extends, and a maximum width/height 125 of the read zone 115, the maximum width/height extending in a direction perpendicular to the maximum distance.

As will be understood by a person skilled in the art, the characteristics of the read zone 115 need not be sufficient to recreate the read zone 115 exactly, but can, for example, describe a larger or smaller area than the read zone 115. The maximum distance 120 and the maximum width/height 125, for example, can be used to create a cylindrical zone that estimates the read zone 115.

The location of the data tag 105 is determined using the spatial location and orientation of the data tag reader device 100, together with characteristics of the read zone 115.

An example of the determination of the location of an RFID tag is described below:

The RFID tag is read by an RFID reader device having a maximum distance 120 of 36 inches (approximately 90 cm) and a maximum width/height 125 of 12 inches (approximately 30 cm). The location of the RFID reader device is determined to have Cartesian coordinates X, Y, Z. The origin of the coordinate system and the orientations of the axes are omitted from the example for clarity reasons. The orientation of the RFID reader device is determined to be pointing along the Y-axis.

The location of the RFID tag in this example can be determined to be in the area of X±6 inches (approximately 15 cm), Y to Y+36 inches (approximately 90 cm), Z±6 inches (approximately 15 cm).

The location of the data tag 105 may be refined by reading the data tag 105 multiple times. Power ramping can be used, which means that an RFID tag is read by an RFID reader device at different power levels. For example, the RFID tag can be read by the RFID reader device at a first power level and subsequently read by the RFID reader device at reduced power levels until the RFID tag is no longer able to be read.

The location of the RFID tag can be determined to lie in the outer limits of the read zone 115 associated with the lowest power level that was able to read the RFID tag. Other known radio frequency techniques can also be utilized to locate the RFID tag relative to the RFID reader device, for example, the amount of time it took to read the RFID tag, and Return Signal Strength Indicator (RSSI). Similar methods can be applied by data tag reader devices 100 that include an optical sensor or other sensor type.

As will be readily understood by a person skilled in the art, the orientation of the data tag reader device 100 need not be determined when the read zone 115 is omni-directional, as a read zone 115 that is omni-directional does not change when the orientation of the data tag reader device 100 changes.

The user is notified of the location of the data tag 105 by the data tag reader device 100. The notification can be visual or audible, for example, such as an audio tone played to the user, or an image or text displayed to the user on a display screen 130 or printed on a printer. According to one embodiment, the location of the data tag 105 is used as input to an application or device, for example.

The present invention is applicable to any type of data tag 105. The data tag 105 may, for example, comprise a linear barcode, a two or three dimensional image, or a wireless service set identifier.

Figure 2:
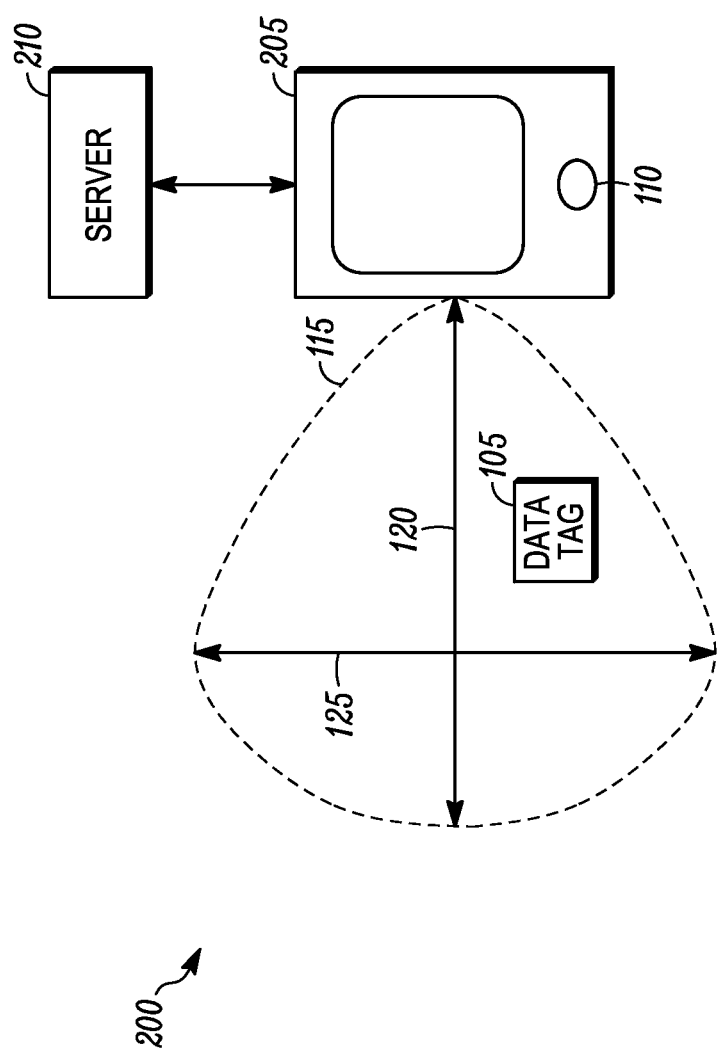
FIG. 2 is a block diagram of a system for identifying a location of a data tag, in accordance with some embodiments.

FIG. 2 is a block diagram of a system 200 for identifying a location of a data tag 105, according to one embodiment.

The system 200 comprises a data tag reader device 205 and a server 210. The server 210 includes an ultrasonic module (not shown) and a wireless data reception interface (not shown).

The data tag reader device 205 is similar to the data tag reader device 100 of FIG. 1, except that the data tag reader device 205 includes an ultrasonic transducer (not shown) rather than a GPS module, and a data transmission interface (not shown).

The location of the data tag reader device 205 is determined using ultrasonic identification. The data tag reader device 205 emits one or more ultrasonic chirps which are heard by the ultrasonic module of the server 210 and/or ultrasonic modules of one or more access points (not shown) of the server. The server 210 is then able to determine the location of the data tag reader device 205 from the one or more ultrasonic chirps using known ultrasonic locationing methods.

Alternatively, the server 210 can comprise an ultrasonic transducer (not shown) and the data tag reader device 205 can comprise an ultrasonic module. The server 210 can then emit one or more ultrasonic chirps which are heard by the data tag reader device 205, which is then able to determine its own location using known ultrasonic locationing methods.

The location need not be determined on an absolute or global level, but in certain embodiments it is sufficient to determine the location of the data tag reader device 205 relative to the ultrasonic module of the server 210, or another suitable entity in the system 200.

The orientation of the data tag reader device 205 is determined in the same way as for the data tag reader device 100 of FIG. 1.

Characteristics of a read zone 115 of the data tag reader device 205 are determined relative to the data tag reader device 205 at least in part using data from the orientation module. The characteristics of the read zone 115 are then transmitted on the data transmission interface to the server 210, together with data of the data tag 105.

The location of the data tag 105 can then be determined by the server 210 based upon the read zone of the data tag reader device 205 and the location of the data tag reader device 205.

The server 210 may plot locations of multiple data tags 105 together with data from the data tags 105, save the data and/or locations to a database, transmit or further process the data and/or locations.

As discussed above in the context of FIG. 1, the location and orientation of the data tag reader device 205 can be determined independently of each other, and independently of any activation of the data tag reader device 205.

According to an alternative embodiment, a system (not shown) is provided that is similar to the system 200 of FIG. 2; wherein however the server and data tag reader device do not include ultrasonic modules. Instead, Radio Frequency such as wireless local area network (WLAN) based location technology or light or image based tracking technology such as known infrared tracking technology is used to identify the location of the data tag reader device. As will be understood by a person skilled in the art(s), the use of technologies such as WLAN based location technology to identify the location of the data tag reader device does not preclude the data tag reader device from also having an ultrasonic module.

Figure 3:
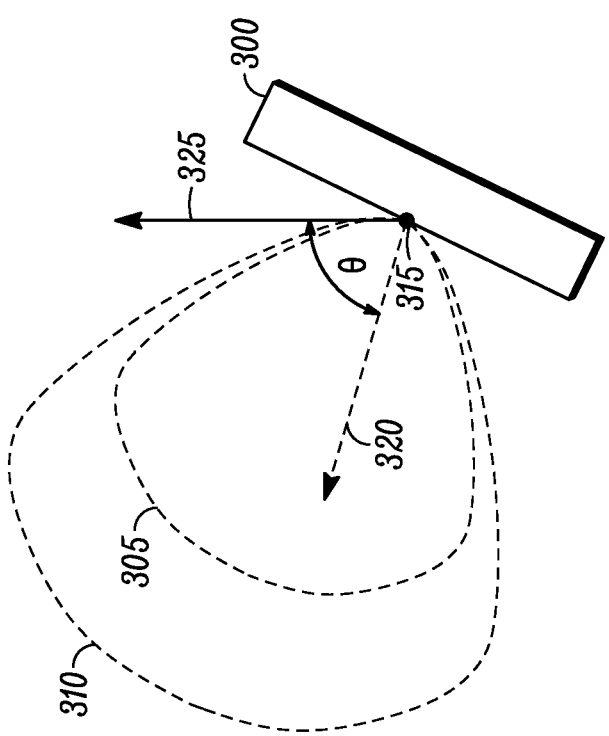
FIG. 3 is a diagram illustrating the read zones of an RFID reader device in accordance with some embodiments.

FIG. 3 is a diagram illustrating the read zones of an RFID reader device 300, according to one embodiment. The RFID reader device 300 is an embodiment of the data tag reader device 100 or FIG. 1 or the data tag reader device 205 of FIG. 2. A standard read zone 305 and an extended read zone 310 are illustrated. The extended read zone 310 may be activated based upon a pressure of a trigger, or through any other suitable means, and corresponds to a higher power output of the RFID enabled device 300 than is used to create the standard read zone 305. As will be understood by a person skilled in the art, any suitable shape or size of the read zone 305, 310 may be used.

A location 315 of the RFID reader device 300, or a portion thereof, is determined using known location based technology. Examples of known location based technology include GPS and ultrasonic identification, as discussed previously.

Next, an orientation of the RFID reader device 300 is determined. For example, as shown, an angle θ is determined between a reading direction 320 of the RFID reader device 300 and a predetermined direction 325. Examples of the predetermined direction 325 include the compass direction due North and the gravity vector.

As will be readily understood by a person skilled in the art, another read zone can be determined using first and second angles, thus enabling a read zone to extend from the RFID reader device 300 in any direction.

Read zones of other types of data tag reader devices can be determined in a similar manner. For example, instead of the read zones 305, 310 corresponding to a power output, read zones of a barcode reader can correspond to different settings of an optical sensor, such as focal length or zoom.

Figure 4:
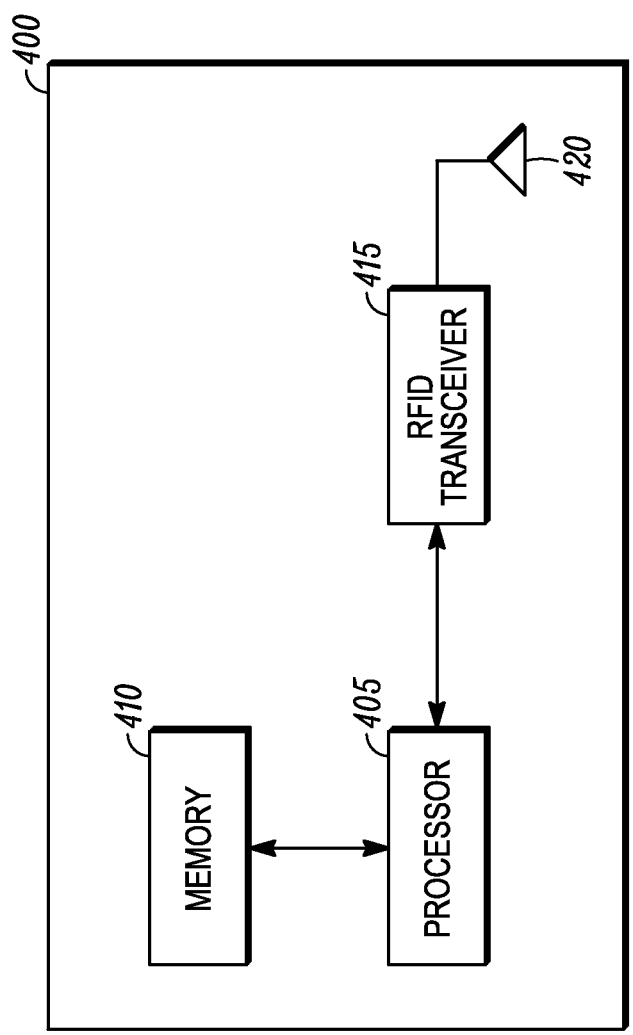
FIG. 4 is a block diagram of an RFID reader device, in accordance with some embodiments.

FIG. 4 is a block diagram of an RFID reader device 400, according to one embodiment. The data tag reader device 100 of FIG. 1, the data tag reader device 205 of FIG. 2 or the RFID reader device 300 of FIG. 3 can be identical or similar to the RFID reader device 400.

The RFID reader device 400 comprises a processor 405, a memory 410, an RFID transceiver 415 and an antenna 420.

The processor 405 and memory 410 may be replaced by dedicated hardware, and the RFID reader device 400 may include software, hardware, or firmware, or any combination thereof.

The processor 405 processes computer readable program code components stored in the memory 410 and implements various methods and functions of the RFID reader device 400 as described herein.

The RFID reader device 400 can include a system bus (not shown) that couples various system components, including coupling the memory 410 to the processor 405. The system bus may be any of several types of bus structures including a memory bus or memory controller, a peripheral bus, and a local bus using any of a variety of bus architectures.

The structure of system memory 410 is well known to those skilled in the art and can include a basic input/output system (BIOS) stored in a read only memory (ROM) and one or more program modules such as operating systems, application programs and program data stored in random access memory (RAM).

The RFID reader device 400 can operate in a networked environment using logical connections to one or more remote computers or other devices, such as a server, a router, a network personal computer, a peer device or other common network node, a wireless telephone or wireless personal digital assistant.

The operation of the RFID reader device 400 can be controlled by a variety of different program modules. Examples of program modules are routines, programs, objects, components, and data structures that perform particular tasks or implement particular abstract data types. Embodiments of the present invention can also be practiced with other computer system configurations, including hand-held devices, multiprocessor systems, microprocessor-based or programmable consumer electronics, network PCs, minicomputers, mainframe computers, personal digital assistants and the like. Furthermore, embodiments of the present invention can also be practiced in distributed computing environments where tasks are performed by remote processing devices that are linked through a communications network. In a distributed computing environment, program modules can be located in both local and remote memory storage devices.

The RFID reader device 400 can include a network interface (not shown) to facilitate communication between the RFID reader device 400 and other devices. The network interface is be used to send, for example, RFID data, RFID read zone and/or RFID location data to a server or other device.

The antenna 420 can be any type of reader antenna known to persons skilled in the relevant art(s), including, but not limited to, a dipole, loop, Yagi-Uda, slot, or patch antenna type.

The transceiver portion 415 receives one or more responses from data tags 105 via the antenna 420. The transceiver portion 415 outputs a decoded data signal generated from the data tag 105 response to the processor 405. The processor 405 then optionally processes the data of the decoded data signal and alternatively or additionally saves or transmits the data.

Other types of data tag reader devices may be similar to the RFID reader device 400, but with the RFID transceiver 415 and antenna 420 replaced by different hardware. Examples include an optical sensor connected to the processor for reading barcodes and/or images, or a WLAN module for receiving an SSID of a wireless network.

Figure 5:
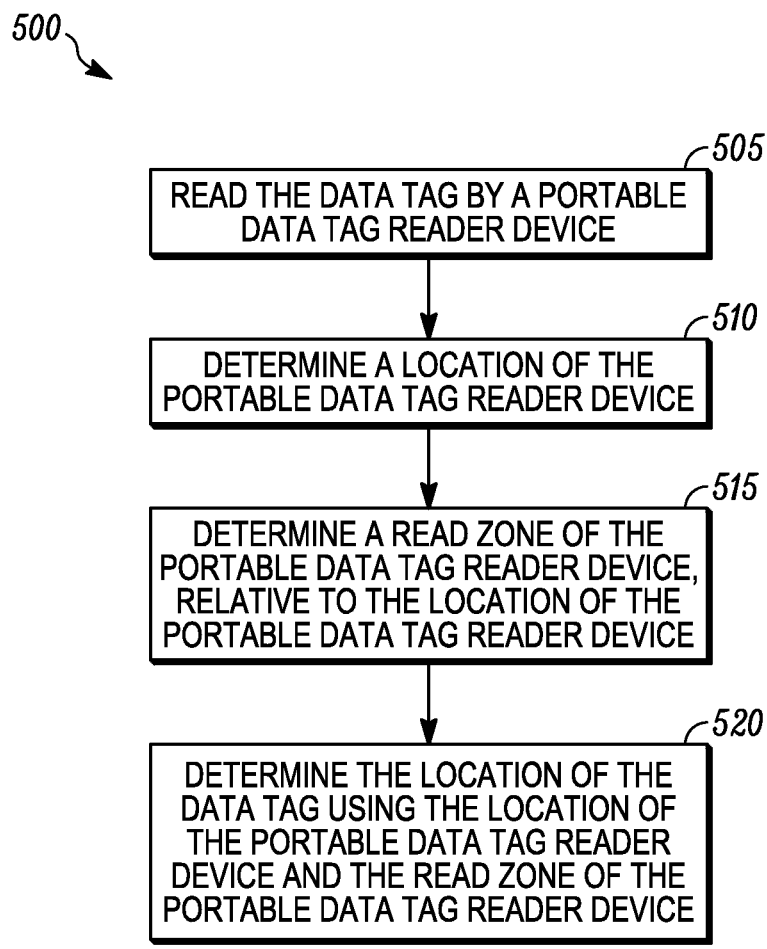
FIG. 5 is a flow diagram illustrating a method of identifying a location of a data tag, in accordance with some embodiments.

FIG. 5 is a flow diagram illustrating a method 500 of identifying a location of a data tag, according to one embodiment.

In 505, the data tag is read by a portable data tag reader device.

In 510, a location of the portable data tag reader device is determined by a processor in operative communication with the reader device. The processor can be a component of the reader device, as illustrated for example in FIG. 4, or a component of an external device such as a server, as illustrated for example in FIG. 2.

In 515, a read zone of the portable data tag reader device, relative to the location of the portable data tag reader device, is determined by the processor.

In 520, the location of the data tag, using the location of the portable data tag reader device and the read zone of the portable data tag reader device, is determined by the processor.

505 and 510 can be performed independently of each other, in any order, and either sequentially or in parallel.

According to certain embodiments, the method further comprises reading the data tag by the portable data tag reader device at a second location, determining the second location of the portable data tag reader device, identifying a second location of the data tag using the second location of the portable data tag reader device and the read zone of the portable data tag reader device, and refining the location of the data tag using the second location.

The location is refined by determining a common area of the first and second locations. Alternatively, the first and second locations may be averaged.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of identifying a location of a data tag, the method comprising:

reading the data tag by a data tag reader module of a portable data tag reader device that includes operatively coupled components comprising an ultrasonic transducer, the data tag reader module, an orientation module, a data transmission interface, a reader device processor, and a memory;

determining, by the reader device processor, a read zone of the portable data tag reader device relative to the portable data tag reader device at least in part using data from the orientation module;

transmitting, by the reader device processor and the data transmission interface, characteristics of the read zone;

receiving the characteristics of the read zone from the portable data tag reader device on a data reception interface of a server operatively coupled to the portable data tag reader device, wherein the server includes operatively coupled components comprising an ultrasonic module operatively coupled to the ultrasonic transducer of the portable data tag reader device, the data reception interface, a server processor, and a memory;

determining, by the server processor, the location of the portable data tag reader device at least in part using the ultrasonic module; and determining, by the server processor, the location of the data tag using the location of the portable data tag reader device and the read zone of the portable data tag reader device.

2. The method of claim 1, wherein the server processor operatively communicates with the portable data tag reader device using a communication system independent of a communication system used by the portable data tag reader to read the data tag, and wherein the independent communication system includes at least one of ultrasonic signaling or image based tracking technology.

3. The method of claim 2, wherein the read zone of the portable data tag reader device is determined at least in part using an orientation of the portable data tag reader device, the orientation obtained by the processor using the independent communication system.

4. The method of claim 1, wherein an orientation of the portable data tag reader device is determined using at least one of a gyroscope, a camera, a compass and an accelerometer.

5. The method of claim 1, wherein the data tag is a Radio Frequency Identification (RFID) tag and the portable data tag reader device comprises a portable RFID reader device.

6. The method of claim 1, wherein the read zone of the portable RFID reader device is determined at least in part using an antenna or sensor pattern.

7. The method of claim 1, wherein the read zone of the portable RFID reader device has an adjustable zoom.

8. The method of claim 1, wherein the data tag is a barcode or image and the portable data tag reader device comprises an optical sensor.

9. The method of claim 1, further comprising:
reading the data tag by the portable data tag reader device at a second location;
determining, by the processor, the second location of the portable data tag reader device;
identifying, by the processor, a second location of the data tag using the second location of the portable data tag reader device and the read zone of the portable data tag reader device; and
refining, by the processor, the location of the data tag using the second location.

10. The method of claim 1, wherein the location of the portable data tag reader device is absolute or relative to another entity.

11. The method of claim 1, further comprising presenting, on a data interface, the location of the data tag.

12. A portable data tag reader device for identifying a location of a data tag, the portable data tag reader device comprising:
an ultrasonic transducer;
a data tag reader module;
an orientation module;
a data transmission interface;
a reader device processor operatively coupled to the data tag reader module, the orientation module and the data transmission interface; and
a memory operatively coupled to the reader device processor, wherein the memory includes computer readable program code components for:
reading the data tag by the data tag reader module;
determining a read zone of the portable data tag reader device relative to the portable data tag reader device at least in part using data from the orientation module; and
transmitting characteristics of the read zone on the data transmission interface to a data reception interface of a server operatively coupled to the portable data tag reader device, wherein the server includes operatively coupled components comprising an ultrasonic module operatively coupled to the ultrasonic transducer of the portable data tag reader device, the data reception interface, a server processor, and a memory, the server processor operable for:
determining, using the read zone characteristics, a location of the portable data tag reader device at least in part using the ultrasonic module; and
determining the location of the data tag using the location of the portable data tag reader device and the read zone of the portable data tag reader device.

13. The portable data tag reader device of claim 12, wherein the portable data tag reader device includes a communication module operable using a second communication system independent from a first communication system to send the read zone characteristics defining a read zone of the portable data tag reader device relative to the server processor, wherein the second communication system includes at least one of an ultrasonic identification module or imaging system, for determining the location of the portable data tag reader device.

14. The portable data tag reader device of claim 13, further including at least one of a gyroscope, a camera, a compass and an accelerometer for determining an orientation of the data tag reader device, wherein the read zone of the portable data tag reader is determined using the orientation of the portable data tag reader, the orientation obtained by the processor using the second communication system.

15. The portable data tag reader device of claim 12, wherein the data tag reader module comprises:
an RFID transceiver; and
an RFID antenna operatively coupled to the RFID transceiver.

16. The portable data tag reader device of claim 12, wherein the data tag reader module comprises an optical sensor.

17. The portable data tag reader device of claim 12, further comprising computer readable program code components for:
reading the data tag a second time;
determining a second location of the portable data tag reader device based upon the reading of the data tag the second time;
identifying a second location of the data tag using the second location of the portable data tag reader device and the read zone of the portable data tag reader device; and
refining the location of the data tag using the second location.

18. The portable data tag reader device of claim 12, wherein the location of the portable data tag reader device is absolute or relative to another entity.

19. The portable data tag reader device of claim 12, further comprising a data output interface, for presenting the location of the data tag.

20. A system for identifying a location of a data tag, the system comprising:

a portable data tag reader device, the portable data tag reader device comprising:
    an ultrasonic transducer;
    a data tag reader module;
    an orientation module;
    a data transmission interface;
    a reader device processor operatively coupled to the data tag reader module, the orientation module and the data transmission interface; and
    a memory operatively coupled to the reader device processor, wherein the memory includes computer readable program code components for:
        reading the data tag by the data tag reader module;
        determining a read zone of the portable data tag reader device relative to the portable data tag reader device at least in part using data from the orientation module; and
        transmitting characteristics of the read zone on the data transmission interface; and
a server operatively coupled to the portable data tag reader device, the server comprising:
    an ultrasonic module operatively coupled to the ultrasonic transducer of the portable data tag reader device;
    a data reception interface;
    a server processor operatively coupled to the ultrasonic module and the data reception interface; and
    a memory operatively coupled to the server processor, wherein the memory includes computer readable program code components for:
        receiving the characteristics of the read zone from the portable data tag reader device on the data reception interface;
        determining the location of the portable data tag reader device at least in part using the ultrasonic module; and
determining the location of the data tag by using the location of the portable data tag reader device and the read zone of the portable data tag reader device.

* * * * *